(12) United States Patent
Kokubun et al.

(10) Patent No.: US 7,196,726 B2
(45) Date of Patent: Mar. 27, 2007

(54) CMOS SENSOR CIRCUIT HAVING A VOLTAGE CONTROL CIRCUIT CONTROLLING A GATE POTENTIAL OF A PHOTODIODE RESET TRANSISTOR TO A POTENTIAL OTHER THAN POWER SOURCE POTENTIALS

(75) Inventors: Masatoshi Kokubun, Kawasaki (JP); Katsuyosi Yamamoto, Kawasaki (JP); Chikara Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 10/058,789

(22) Filed: Jan. 30, 2002

(65) Prior Publication Data
US 2002/0163584 A1    Nov. 7, 2002

(30) Foreign Application Priority Data
May 2, 2001    (JP)    ............................. 2001-135503

(51) Int. Cl.
*H04N 3/14*    (2006.01)
*H04N 5/335*    (2006.01)

(52) U.S. Cl. ...................................... 348/308
(58) Field of Classification Search ................ 348/308, 348/312, 294, 302; 257/223, 230, 445; 250/208.1; 326/27; 365/208
See application file for complete search history.

(56) References Cited

U.S. PATENT DOCUMENTS

| 5,768,203 A | * | 6/1998 | Fuji | ............................ 365/208 |
| 5,907,357 A | * | 5/1999 | Maki | ........................... 348/312 |
| 6,002,123 A | | 12/1999 | Suzuki | |
| 6,356,101 B1 | * | 3/2002 | Erstad | ........................... 326/27 |
| 6,674,471 B1 | * | 1/2004 | Masuyama | ................... 348/312 |

FOREIGN PATENT DOCUMENTS

JP    11-355664    12/1999

* cited by examiner

*Primary Examiner*—Vivek Srivastava
*Assistant Examiner*—James M. Hannett
(74) *Attorney, Agent, or Firm*—Arent Fox, LLP

(57) ABSTRACT

The CMOS sensor circuit comprises a photodiode, a reset transistor resetting the photodiode to an initial voltage, and a voltage control circuit controlling a gate potential of the reset transistor to a potential other than power source potentials. The voltage control circuit consists of an inverter circuit driving a gate of the reset transistor. The inverter circuit includes a P-channel MOS transistor, an N-channel MOS transistor, and a transistor inserted between a drain of the P-channel MOS transistor and a drain of the N-channel MOS transistor so as to control a blooming.

32 Claims, 14 Drawing Sheets

CMOS SENSOR CIRCUIT HAVING A VOLTAGE CONTROL CIRCUIT CONTROLLING A GATE POTENTIAL OF A PHOTODIODE RESET TRANSISTOR TO A POTENTIAL OTHER THAN POWER SOURCE POTENTIALS

BACKGROUND OF THE INVENTION

1. Field of the Invention

The present invention generally relates to a CMOS sensor circuit and, more particularly, to a CMOS sensor circuit which restrains a blooming of a CMOS image sensor.

2. Description of the Related Art

An image sensor is used, in a television camera, etc., as a sensor converting externally obtained optical image information into an electrical signal, and comprises a multitude of pixels arranged in a matrix form. A MOS-type image sensor comprises a pixel circuit formed by a photodiode and a MOS-type FET, and has features of low electric power consumption, low cost, etc, as a CCD-type image sensor dominantly used in conventional technology.

FIG. 1A is a circuit diagram of a first conventional example of a CMOS sensor circuit. In FIG. 1A, 100 is a basic circuit of a CMOS inverter. 110 is a pixel circuit forming a pixel unit together with other pixel circuits. The CMOS inverter 100 comprises a PMOS transistor M4 and an NMOS transistor M6. Vrs is a control voltage (a reset control signal). The CMOS inverter 100 supplies a reset signal RST to a reset transistor M1 of the pixel circuit 110. When the reset control signal Vrs is high-level (H), the PMOS transistor M4 becomes off, and the NMOS transistor M6 becomes on, such that the reset signal RST becomes low-level (L). On the other hand, when the reset control signal Vrs is low-level (L), the PMOS transistor M4 becomes on, and the NMOS transistor M6 becomes off, such that the reset signal RST becomes high-level (H).

The pixel circuit 110 comprises the reset transistor M1, a source follower transistor M2, a select transistor M3, a photodiode PD, and a current source 15. A drain of the reset transistor M1 and a drain of the source follower transistor M2 are connected to a terminal of a reset voltage VR. A source of the reset transistor M1 and a gate of the source follower transistor M2 are connected to a cathode of the photodiode PD. An anode of the photodiode PD is grounded. A source of the source follower transistor M2 is connected to a drain of the select transistor M3.

When the reset signal RST becomes high-level (H), the reset transistor M1 supplies the reset voltage VR to the photodiode PD so as to reset the photodiode PD to an initial voltage. The source follower transistor M2 forms a source follower circuit together with the current source 15 so as to amplify a cathode voltage of the photodiode PD. When a select control signal SLCT becomes high-level (H), the select transistor M3 becomes on so as to connect the source follower transistor M2 to the current source 15, enabling a selective switch of an output voltage of the source follower transistor M2.

Next, a description will be given of operations of this conventional CMOS sensor circuit. When the CMOS inverter 100 is supplied with the reset control signal Vrs at a low-level (L), the PMOS transistor M4 becomes on, and the NMOS transistor M6 becomes off, such that the reset signal RST becomes high-level (H). When the high-level reset signal RST is supplied to a gate of the reset transistor M1, the reset transistor M1 becomes on. Thereby, the cathode of the photodiode PD is connected to the reset voltage VR such that a potential vpd at a node equals the reset voltage VR. Accordingly, electric charges accumulate in the photodiode PD so as to reset the pixel circuit 110. Then, when the reset signal RST becomes low-level (L), i.e., when a gate potential of the reset transistor M1 becomes low-level, the reset transistor M1 becomes off such that the photodiode PD is disconnected from the reset voltage VR.

In this state, when the photodiode PD receives a light, a photoelectric convert voltage is generated in the photodiode PD according to a level of the input light. Then, the source follower transistor M2 composing a source follower amplifies this photoelectric convert voltage. Subsequently, the select control signal SLCT is supplied to the select transistor M3 according to an arbitrary timing so as to output the signal amplified by the source follower transistor M2.

However, this first conventional example causes an issue of a blooming phenomenon. That is, when an intense light is applied to the photodiode PD such that the voltage of the photodiode PD decreases excessively as indicated by a shaded part in FIG. 1B, electrons overflow the photodiode PD, and flow out from the pixel circuit 110 through a substrate into peripheral pixel circuits (not shown in the figure) so as to influence peripheral photodiodes.

FIG. 2A is a circuit diagram of a second conventional example of a CMOS sensor circuit. A pixel circuit 120 shown in FIG. 2A is basically identical to the pixel circuit 110 shown in FIG. 1A, except that the pixel circuit 120 shown in FIG. 2A comprises an N-channel MOS transistor M4 so as to control the above-mentioned blooming. In this structure including the N-channel MOS transistor M4, a bias voltage VB is applied to a gate potential of the N-channel MOS transistor M4 so as to turn on the N-channel MOS transistor M4. This makes it possible for electric charges flown over the photodiode PD to escape to the terminal of the reset voltage VR so as to control the above-mentioned blooming (FIG. 2B).

However, in this second conventional example, the number of elements in each of the pixel circuits increases, and accordingly, an area occupied by each of pixels also enlarges. Therefore, when tens of thousands of pixels are arranged in an image sensor, the area occupied by all of the pixels are considerably enlarged so as to increase a chip size of the image sensor, leading to the increased costs. Additionally, the second conventional example incorporates one transistor while reducing a size of the photodiode so as to restrain the increase in area occupied by all of the pixels. In this case, the photodiode with a reduced size leads to a low sensitivity, or increases susceptibility to noises, which consequently aggravates a quality of images.

SUMMARY OF THE INVENTION

It is a general object of the present invention to provide an improved and useful CMOS sensor circuit in which the above-mentioned problems are eliminated.

A more specific object of the present invention is to provide a CMOS sensor circuit which can restrain a blooming without increasing the number of elements in a pixel unit.

In order to achieve the above-mentioned objects, there is provided according to one aspect of the present invention a CMOS sensor circuit comprising:

a photodiode;

a reset transistor resetting the photodiode to an initial voltage; and a voltage control circuit controlling a gate potential of the reset transistor to a potential other than power source potentials.

According to the present invention, the reset transistor is kept from completely turning off. Thereby, when an intense light enters the photodiode, electric charges flown over the photodiode can escape to a terminal of a reset voltage source via the reset transistor so as to control a blooming phenomenon without increasing the number of elements in a pixel unit.

Other objects, features and advantages of the present invention will become more apparent from the following detailed description when read in conjunction with the accompanying drawings.

BRIEF DESCRIPTION OF THE DRAWINGS

FIG. 5A is a block diagram of a vertical scanning shift register/reset control circuit shown in FIG. 3;

DETAILED DESCRIPTION OF THE PREFERRED EMBODIMENTS

A description will now be given, with reference to the drawings, of embodiments according to the present invention.

Figure 1B:
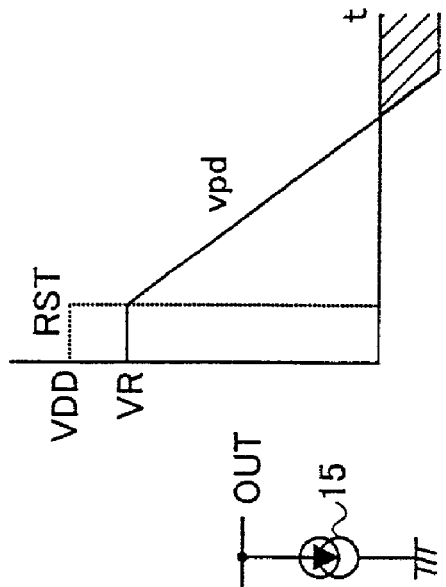
FIG. 1B shows changes in potentials of a photodiode and a gate of a reset transistor shown in FIG. 1A.
Figure 1A:
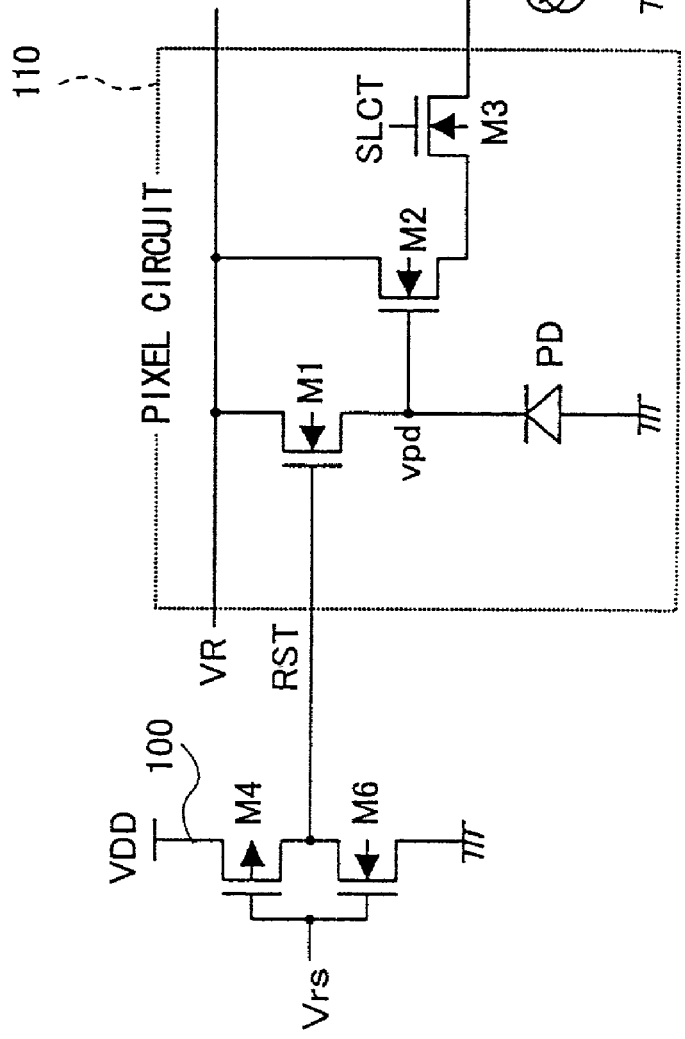
FIG. 1A is a circuit diagram of a first conventional example of a CMOS sensor circuit.
Figure 2A:
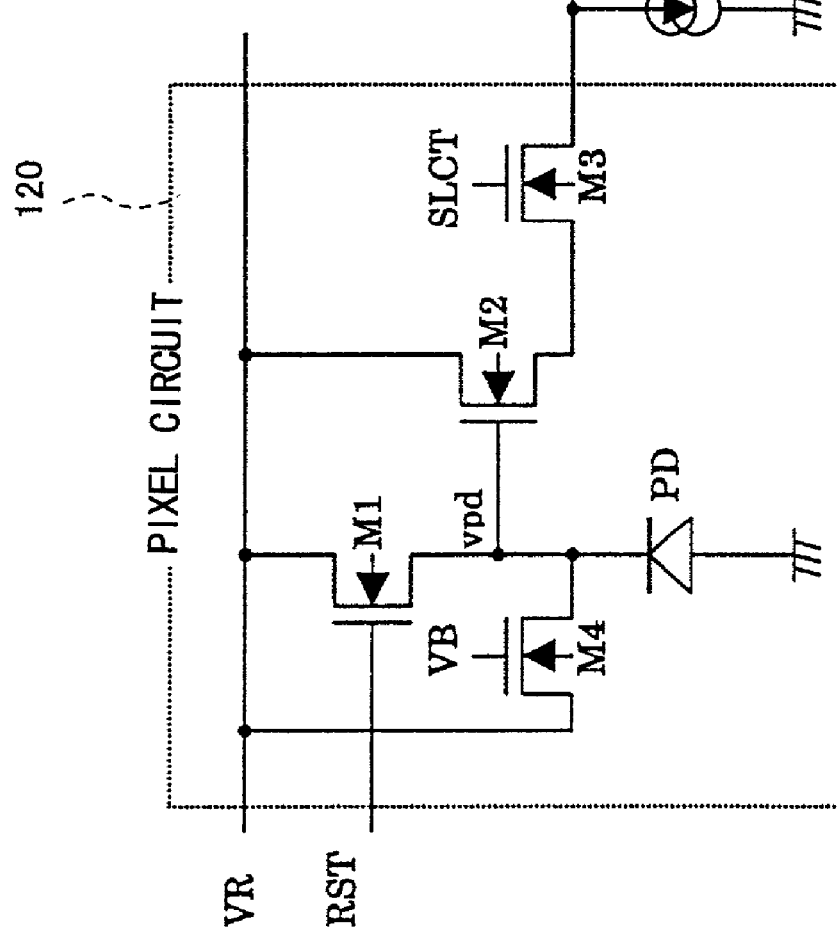
FIG. 2A is a circuit diagram of a second conventional example of a CMOS sensor circuit.
Figure 2B:
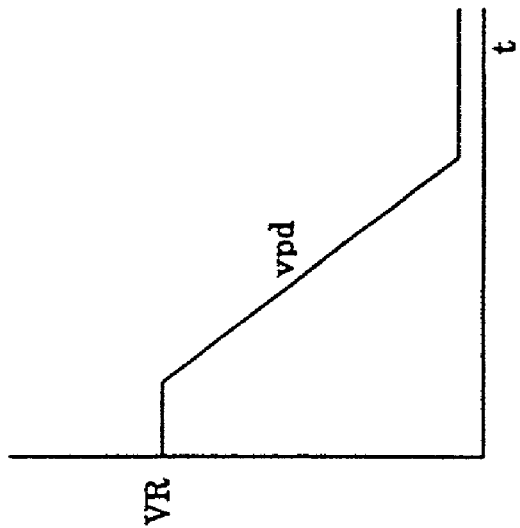
FIG. 2B shows changes in voltage of a photodiode shown in FIG. 2A.
Figure 3:
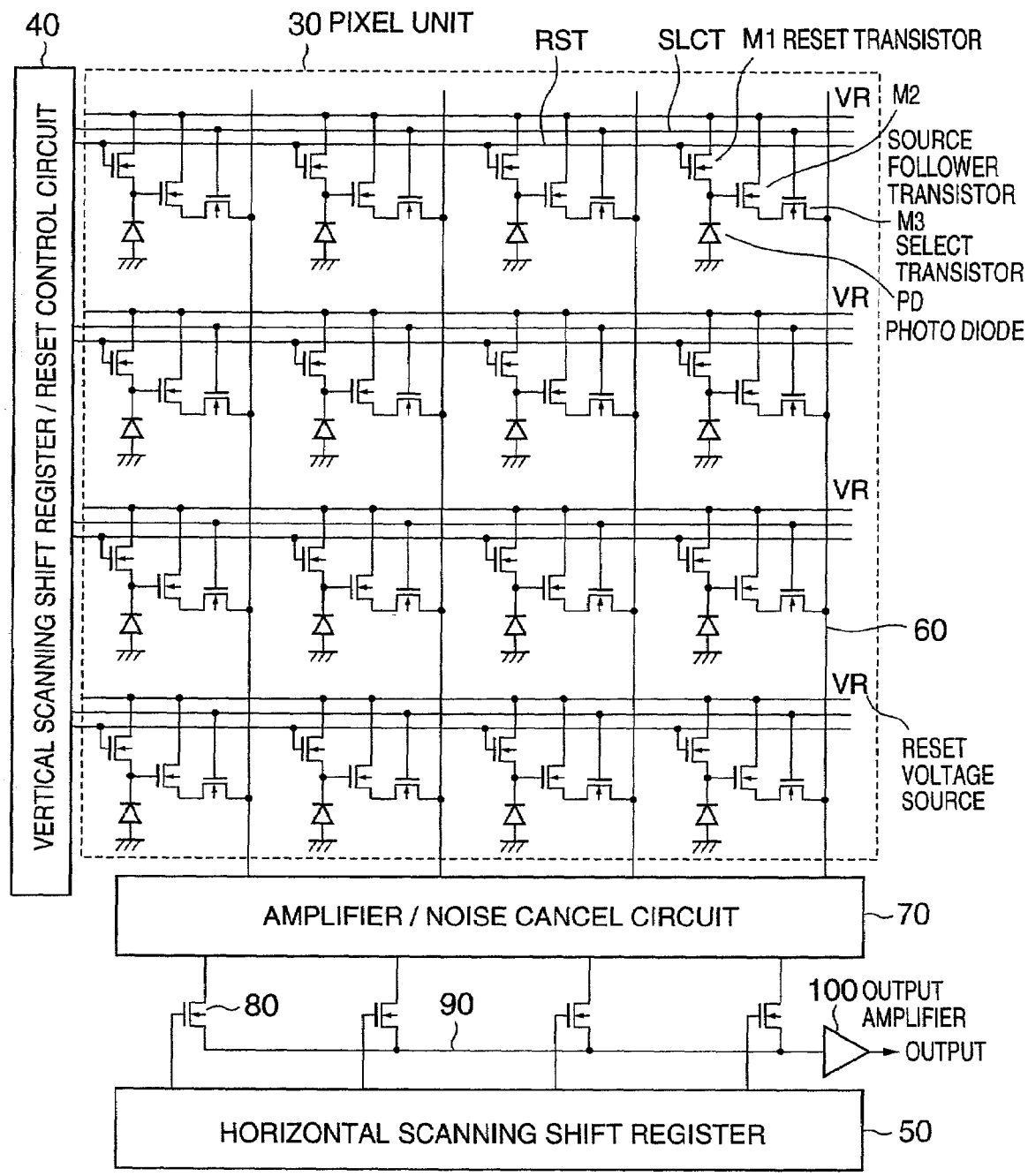
FIG. 3 is a circuit diagram of a CMOS sensor circuit according to the present invention.

FIG. 3 is a circuit diagram of a CMOS sensor circuit as a whole. As shown in FIG. 3, the CMOS sensor circuit comprises a pixel unit 30 including 4×4 pixels, a vertical scanning shift register/reset control circuit 40 to specify a pixel in a x-direction, and a horizontal scanning shift register 50 to specify a pixel in a y-direction. It is noted that, although FIG. 3 shows only 4×4 cells (pixel circuits), the pixel unit 30 actually contains a larger number of cells than shown in FIG. 3.

Figure 4A:
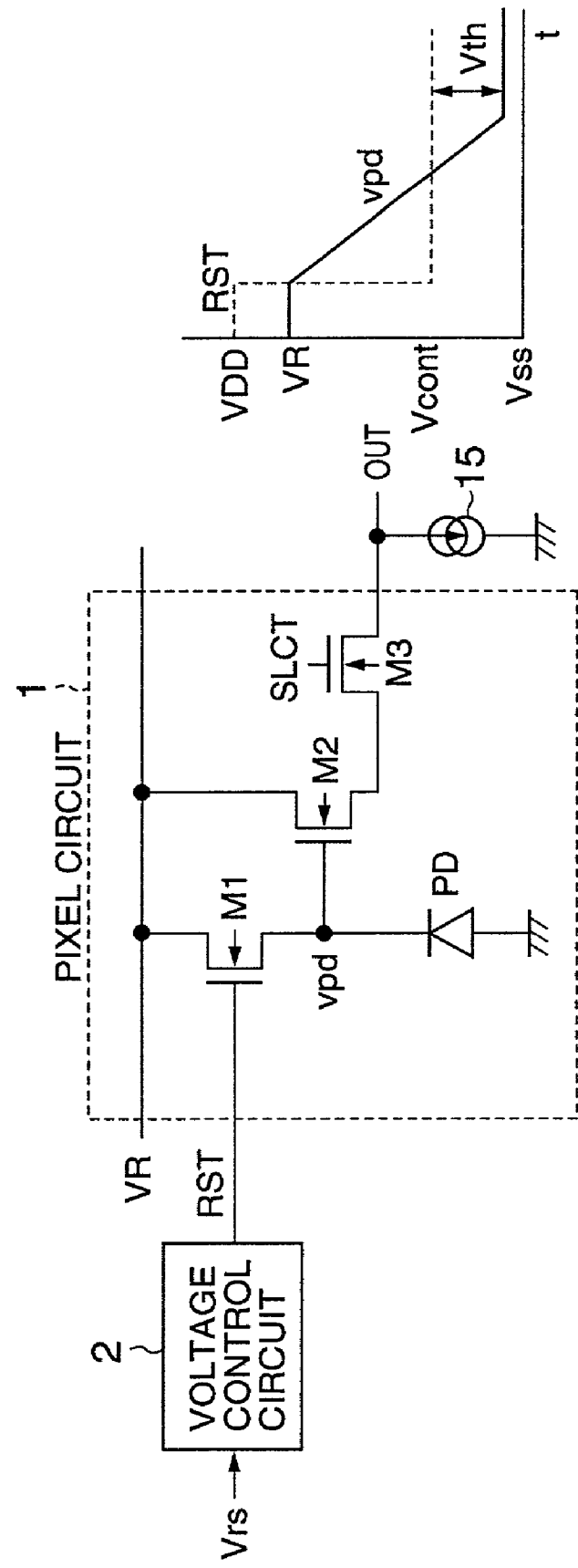
FIG. 4A is a circuit diagram of a pixel circuit composing a pixel unit of the CMOS sensor circuit shown in FIG. 3.

FIG. 4A is a circuit diagram of a pixel circuit 1 composing the pixel unit 30 of the CMOS sensor circuit. As shown in FIG. 4A, the pixel circuit 1 comprises a reset transistor M1, a source follower transistor M2, a select transistor M3, and a photodiode PD. Each of select control lines SLCT wired horizontally from the vertical scanning shift register/reset control circuit 40 is connected to a gate of the select transistor M3. Each of reset signal lines RST wired horizontally from the vertical scanning shift register/reset control circuit 40 is connected to a gate of the reset transistor M1. Each of reset voltage lines VR is connected to a drain of the source follower transistor M2. As also shown in FIG. 3, a source/drain of the select transistor M3 is connected to one of vertical signal lines 60 aligned in a column (vertical) direction. One end of the vertical signal line 60 is connected to an amplifier/noise cancel circuit 70. The amplifier/noise cancel circuit 70 is connected to a horizontal signal line 90 via one of horizontal selection transistors 80 driven by a selective pulse supplied from the horizontal scanning shift register 50. The horizontal signal line 90 is connected to an output amplifier 100. An output of the amplifier/noise cancel circuit 70 is sent out via the horizontal selection transistor 80, the horizontal signal line 90, and the output amplifier 100.

The vertical scanning shift register/reset control circuit 40 shown in FIG. 3 comprises a voltage control circuit 2 shown in FIG. 4A connected to each of the reset signal lines RST. The voltage control circuit 2 generates a reset signal RST in response to an externally supplied reset control signal Vrs. Also, the voltage control circuit 2 applies the reset signal RST to the gate of the reset transistor M1 so as to reset the photodiode PD to an initial voltage (a reset voltage VR), and thereafter, controls a gate potential of the reset transistor M1 to a potential (a bias voltage) Vcont other than power source potentials. In other words, after impressing the reset voltage VR, the voltage control circuit 2 applies the constant bias voltage Vcont to the gate of the reset transistor M1 so as to keep the reset transistor M1 from completely turning off (such that some amount of electric current can be flown therethrough). In short, the voltage control circuit 2 clamps the gate potential of the reset transistor M1 to the potential Vcont.

The potential Vcont is a potential other than a high-potential power source voltage VDD forming the reset signal RST and a low-potential power source voltage VSS corresponding to a ground potential.

Figure 4B:
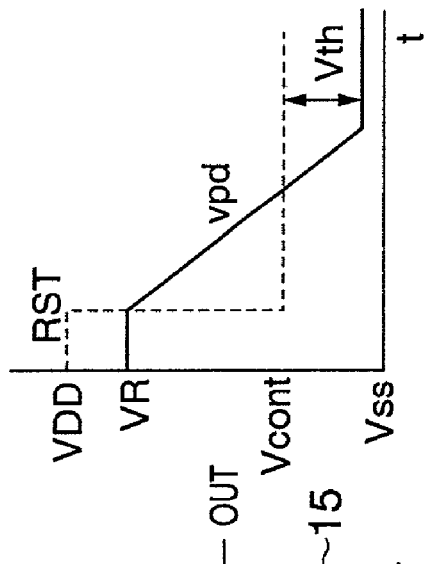
FIG. 4B shows changes in potentials of a photodiode and a gate of a reset transistor shown in FIG. 4A.

As shown in FIG. 4B, the voltage control circuit 2 applies the reset signal RST at the power source voltage VDD to the reset transistor M1 such that a cathode potential vpd of the photodiode PD equals the reset voltage VR. Thereafter, the voltage control circuit 2 turns off the reset signal RST, and supplies the predetermined potential Vcont. Thereby, the reset transistor M1 is kept from completely turning off. The photodiode PD starts accumulating electric charges according to the level of a light such that the cathode potential vpd gradually decreases. Then, when the cathode potential vpd becomes lower than the gate potential Vcont of the reset transistor M1 by a threshold voltage Vth, the reset transistor M1, which has been kept from completely turning off, turns on. From this point on, the electric charges accumulated in the photodiode PD can escape to a terminal of the reset voltage source VR via the reset transistor M1. Accordingly, even when an intense light enters a pixel within a particular integral time, this effect allows excess amounts of the electric charges to be absorbed in the terminal of the reset voltage source VR so as to alleviate influences thereof exerted on the periphery of the pixel receiving the above-mentioned intense light. Thereby, a blooming phenomenon can be restrained without adding a new transistor in the pixel circuit that might enlarge an area occupied by each of the pixels.

In the arrangement shown in FIG. 4A, the reset signal RST is formed by a one-shot pulse. However, the reset signal RST may be formed by a series of two or more pulses so as to ensure an integrating operation, as described below. A description will be given, with reference to FIG. 5A, FIG. 5B and FIG. 6, of this arrangement.

FIG. 5A is a block diagram of an example of the vertical scanning shift register/reset control circuit 40 shown in FIG. 3. The vertical scanning shift register/reset control circuit 40 shown in FIG. 5A corresponds to the 4×4 arrangement shown in FIG. 3, and comprises cascaded flip-flops FF1, FF2, FF3 and FF4 (in the case of the 4×4 arrangement), and logic circuits LGC1, LGC2, LGC3 and LGC4 connected to signal lines transmitting control signals A, B and C (the logic circuit LGC4 is not shown to simplify the figure). The flip-flop FF1 at a first stage receives a control signal CNTL1 from outside. The logic circuits LGC1, LGC2, LGC3 (and LGC4) receive outputs Q1, Q2 and Q3 from the flip-flops FF1, FF2, FF3 (and FF4), respectively, and also receive the control signals A, B and C so as to output the select control signal SLCT and the reset control signal Vrs. The logic circuits LGC1, LGC2, LGC3 (and LGC4) correspond to the four sets of the horizontally wired lines in the pixel unit 30 shown in FIG. 3, i.e., the four sets of the select control line SLCT and the reset signal line RST. For example, the logic circuit LGC1 corresponds to a first (uppermost in FIG. 3) set of the lines, and a select gate 1 outputs the select control signal SLCT, and a reset gate 1 outputs the reset control signal Vrs.

Figure 5B:
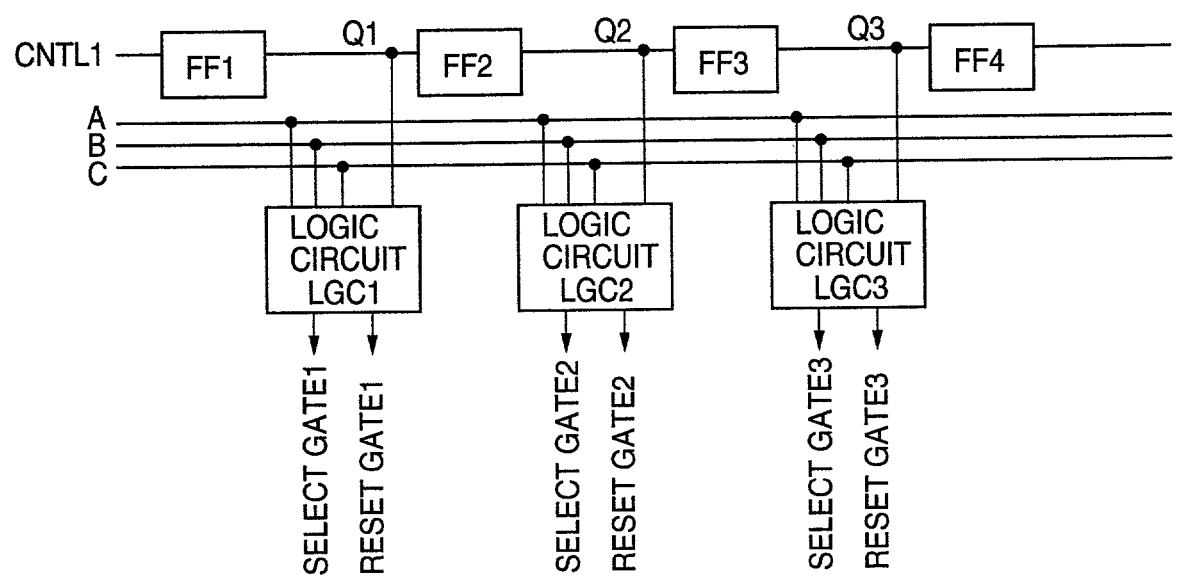
FIG. 5B is a circuit diagram of each of logic circuits shown in FIG. 5A.
Figure 5B:
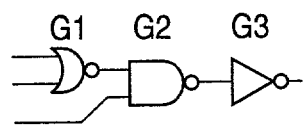

Each of the logic circuits LGC1, LGC2, LGC3 and LGC4 comprises two circuits each consisting of a NOR gate G1, a NAND gate G2 and an inverter G3 shown in FIG. 5B. One of the two circuits generates the select control signal SLCT and the other generates the reset control signal Vrs. The NOR gate G1 of the circuit generating the select control signal SLCT receives the control signals A and C, and the NOR gate G1 of the circuit generating the reset control signal Vrs receives the control signals A and B. In each of the two circuits, the NAND gate G2 receives an output of the NOR gate G1, and the output of the corresponding flip-flop FF1, FF2, FF3 (or FF4). For example, in each of the two circuits of the logic circuit LGC1, the NAND gate G2 receives the output Q1 of the flip-flop FF1. The NAND gate G2 of each of the two circuits outputs the select control signal SLCT/the reset control signal Vrs via the inverter G3.

Figure 6:
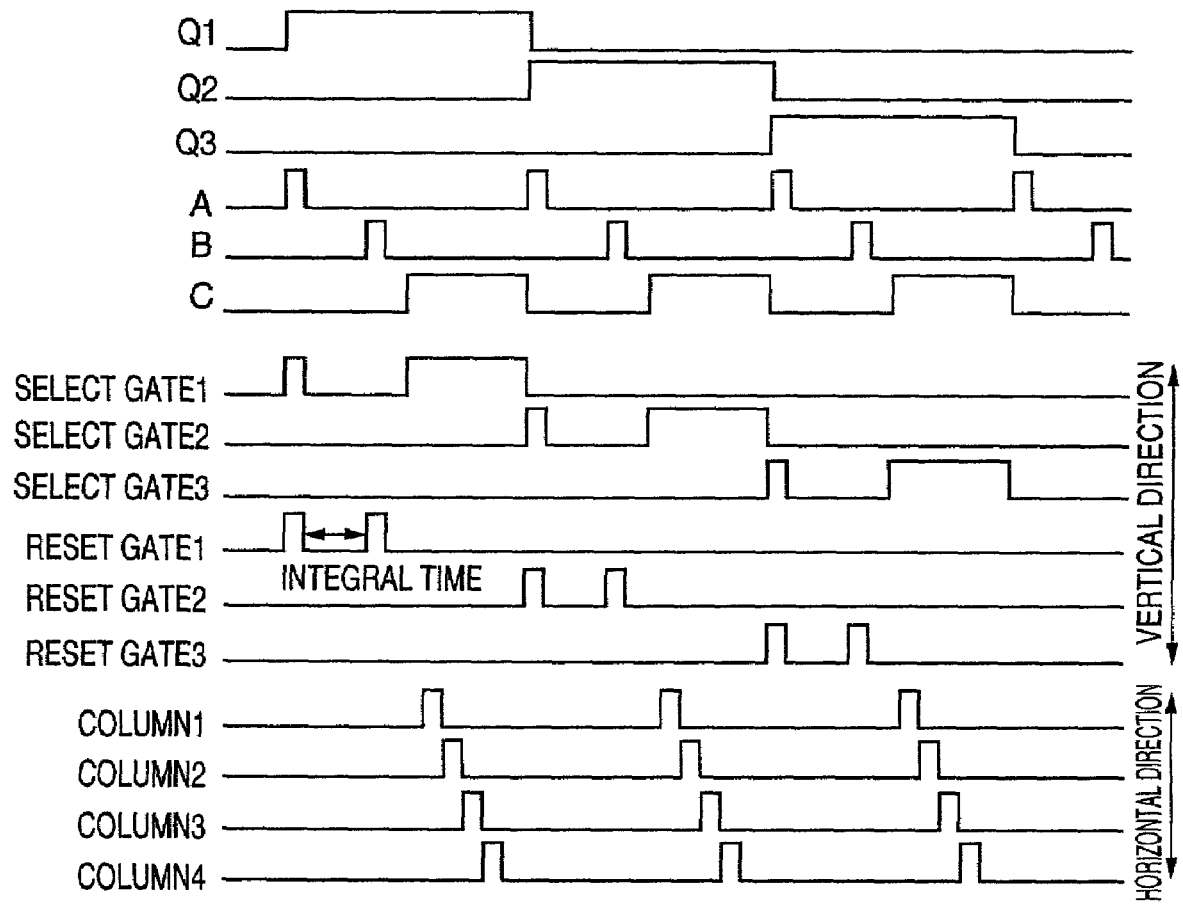
FIG. 6 is a timing chart showing operations of the vertical scanning shift register/reset control circuit shown in FIG. 5A and FIG. 5B.

FIG. 6 is a timing chart showing operations of the arrangement shown in FIG. 5A and FIG. 5B. After receiving the control signal CNTL1 from outside, the outputs Q1, Q2 and Q3 of the flip-flop FF1, FF2 and FF3 (FF4 omitted) vary as shown in FIG. 6. Also, the control signals A, B and C from outside vary as shown in FIG. 6. The logic circuits LGC1, LGC2 and LGC3 output the select control signals SLCT and the reset control signals Vrs, as shown in FIG. 6. Each of the reset control signals Vrs consists of two pulses separated from each other by a time equivalent to an interval between the control signals A and B. These two pulses are supplied to the voltage control circuit 2 shown in FIG. 4A. The voltage control circuit 2 receives this reset control signal Vrs and generates the reset signal RST. The above-mentioned time becomes an integral time so as to surely reset the photodiode PD effectively.

Besides, FIG. 6 also shows scanning pulses (COLUMN 1–4) of the horizontal scanning shift register 50 shown in FIG. 3. The horizontal scanning shift register 50 receives a control signal CNTL2 (to be mentioned with reference to FIG. 19) from outside, and generates the scanning pulses shown in FIG. 6.

Next, a description will be given of examples of the structure of the voltage control circuit 2.

Figure 7:
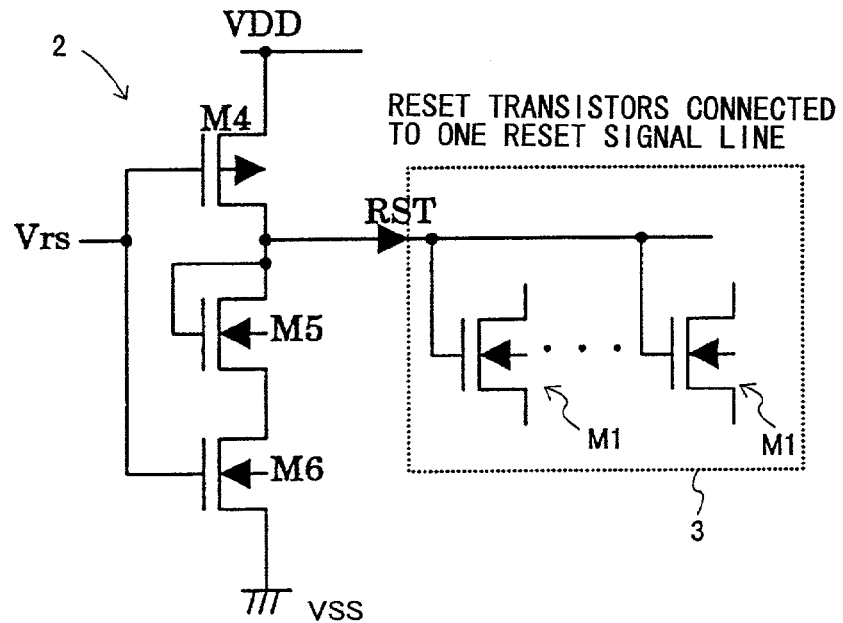
FIG. 7 is a circuit diagram for explaining a first structural example of a voltage control circuit of the CMOS sensor circuit according to the present invention.

FIG. 7 is a circuit diagram for explaining a first structural example of the voltage control circuit 2 of the CMOS sensor circuit according to the present invention. In FIG. 7, a dotted-lined quadrilateral 3 indicates the reset transistors M1 connected to one of the reset signal lines RST shown in FIG. 3. In this first structural example, the voltage control circuit 2 is formed by a CMOS inverter comprising a P-channel MOS transistor M4 and an N-channel MOS transistor M6. The reset control signal Vrs is the input of the voltage control circuit 2. The reset signal RST is the output of the voltage control circuit 2. VDD and VSS are the power source voltages. The voltage control circuit 2 is characterized by comprising an N-channel MOS transistor M5 inserted between a drain of the P-channel MOS transistor M4 and a drain of the N-channel MOS transistor M6. The N-channel MOS transistor MS is a transistor for controlling the above-mentioned blooming.

Next, a description will be given of operations of the CMOS sensor circuit shown in FIG. 7.

When the reset control signal Vrs changes from low-level to high-level, the P-channel MOS transistor M4 becomes off, and the N-channel MOS transistor M6 becomes on. A node of the reset signal RST comes to have a potential in the proximity of a threshold voltage Vth of the N-channel MOS transistor MS, and applies this potential to the gate of the reset transistor M1. At this point, since the reset transistor M1 turns on, excess amounts of electric charges accumulated in the photodiode PD can escape to the terminal of the reset voltage source VR via the reset transistor M1 so as to restrain the blooming phenomenon.

Figure 8:
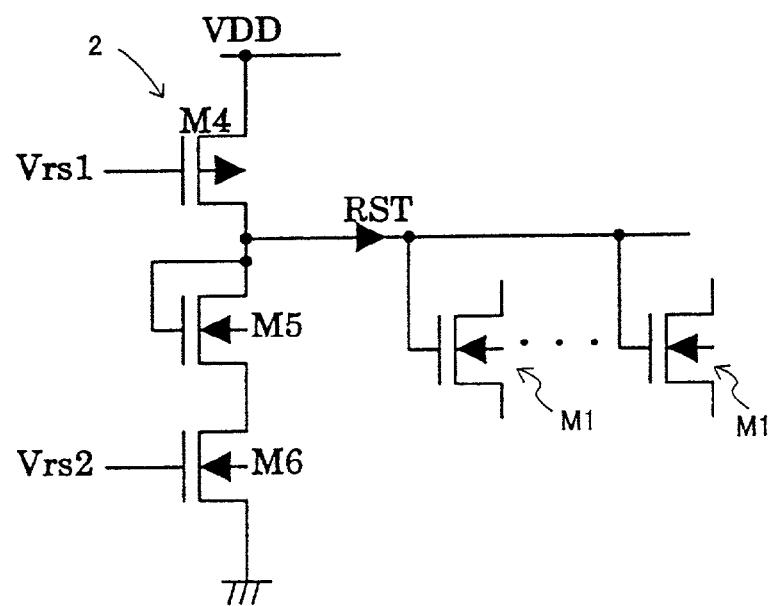
FIG. 8 is a circuit diagram for explaining a second structural example of the voltage control circuit of the CMOS sensor circuit according to the present invention.

FIG. 8 is a circuit diagram for explaining a second structural example of the voltage control circuit 2 shown in FIG. 4A. Elements in FIG. 8 that are identical to the elements shown in FIG. 7 will not be described in detail. In this second structural example, the voltage control circuit 2 is characteristically structured such that the reset control signal Vrs shown in FIG. 7 is separately supplied to the P-channel MOS transistor M4 and the N-channel MOS transistor M6. As shown in FIG. 8, a reset control signal Vrs1 is input into a gate of the P-channel MOS transistor M4, and a reset control signal Vrs2 is input into a gate of the N-channel MOS transistor M6.

In this second structural example, the input reset control signals are separately supplied to the P-channel MOS transistor M4 and the N-channel MOS transistor M6 so as to increase a falling speed by turning on both the P-channel MOS transistor M4 and the N-channel MOS transistor M6 according to individual input timings.

Next, a description will be given of operations of the CMOS sensor circuit shown in FIG. 8.

When the reset control signal Vrs1 changes from high-level to low-level, the P-channel MOS transistor M4 becomes on, and when the reset control signal Vrs2 changes from low-level to high-level, the N-channel MOS transistor M6 becomes on. Thereby, gate potentials of the P-channel MOS transistor M4 and the N-channel MOS transistor M5 can be instantly fixed. Then, the node of the reset signal RST comes to have a potential changed from a ground level to the power source voltage VDD plus the threshold voltage Vth of the N-channel MOS transistor M5, and applies this potential to the gate of the reset transistor M1. Since the reset transistor M1 becomes on at this point, excess amounts of electric charges accumulated in the photodiode PD can escape to the terminal of the reset voltage source VR via the reset transistor M1 so as to restrain the blooming phenomenon.

Figure 9:
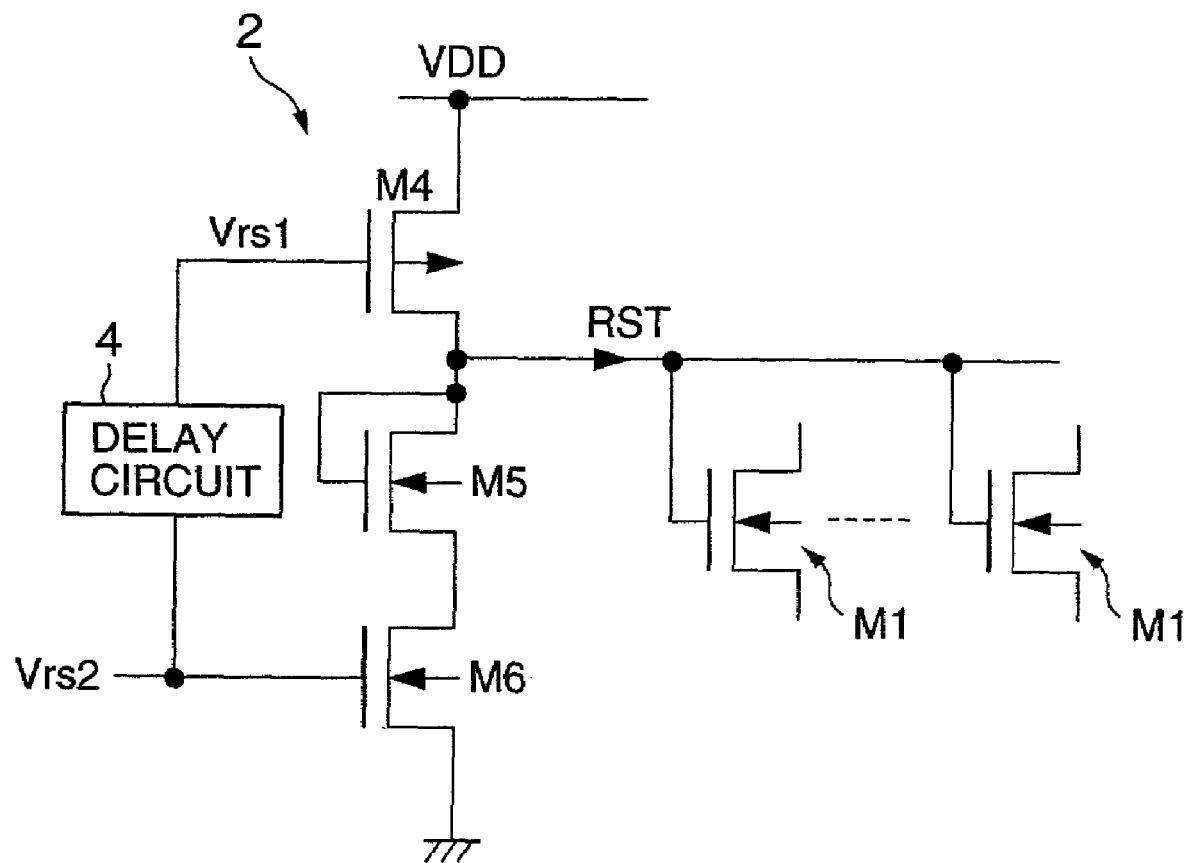
FIG. 9 is a circuit diagram for explaining a third structural example of the voltage control circuit of the CMOS sensor circuit according to the present invention.

FIG. 9 is a circuit diagram for explaining a third structural example of the voltage control circuit 2 shown in FIG. 4A. In this third structural example, the voltage control circuit 2 is characterized by comprising a delay circuit 4 producing the reset control signal Vrs1 on the basis of the input (the reset control signal Vrs2) to the gate of the N-channel MOS transistor M6. In other words, the delay circuit 4 delays the reset control signal Vrs2 so as to produce the reset control signal Vrs1. Thereby, both the P-channel MOS transistor M4 and the N-channel MOS transistor M6 can be turned on. It is noted that the manner of restraining the blooming phenomenon is substantially the same as described with reference to FIG. 7.

Figure 10:
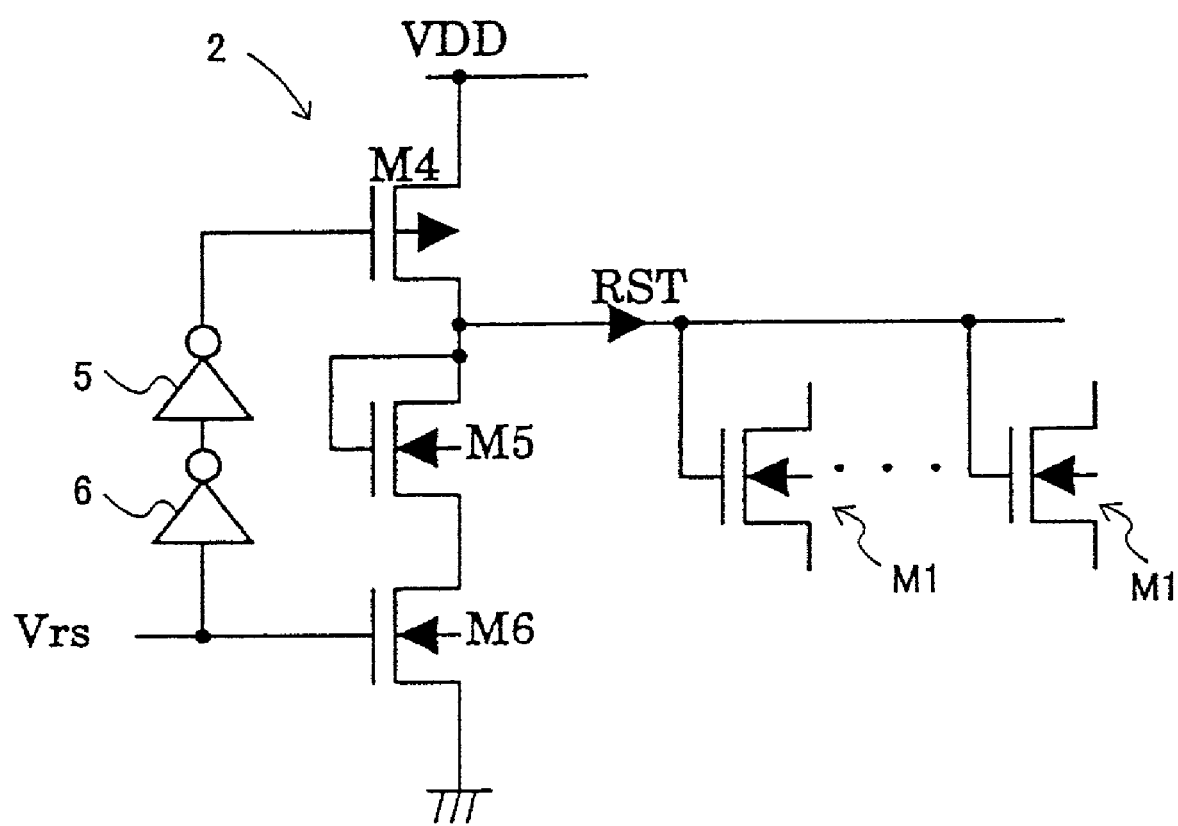
FIG. 10 is a circuit diagram for explaining a fourth structural example of the voltage control circuit of the CMOS sensor circuit according to the present invention.

FIG. 10 is a circuit diagram for explaining a fourth structural example of the voltage control circuit 2 shown in FIG. 4A. This fourth structural example specifically illustrates a structure of the delay circuit 4 shown in FIG. 9. In this fourth structural example, the delay circuit 4 shown in FIG. 9 is characteristically structured by serially connecting an even number of inverters 5 and 6.

Figure 11:
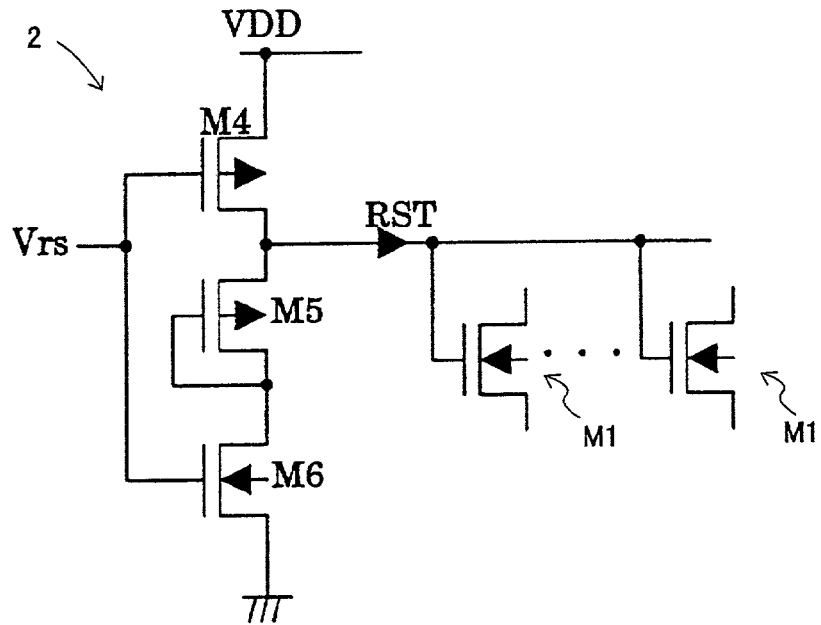
FIG. 11 is a circuit diagram for explaining a fifth structural example of the voltage control circuit of the CMOS sensor circuit according to the present invention.

FIG. 11 is a circuit diagram for explaining a fifth structural example of the voltage control circuit 2 shown in FIG. 4A. In this fifth structural example, the voltage control circuit 2 is characterized by comprising a F-channel MOS transistor M5 for controlling the above-mentioned blooming, in place of the N-channel MOS transistor M5 shown in FIG. 7.

Figure 12:
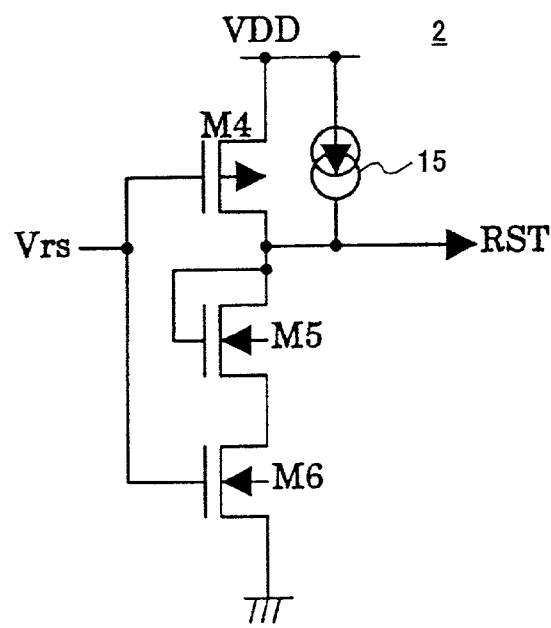
FIG. 12 is a circuit diagram for explaining a sixth structural example of the voltage control circuit of the CMOS sensor circuit according to the present invention.

FIG. 12 is a circuit diagram for explaining a sixth structural example of the voltage control circuit 2 shown in FIG. 4A. In this sixth structural example, the voltage control circuit 2 is characterized by comprising a constant current source 15 added to the node of the reset signal RST shown in FIG. 7, which is an output node of the voltage control circuit 2. This constant current source 15 biases the N-channel MOS transistor M5 and the N-channel MOS transistor M6 at fixed potentials so as to apply a more stable potential to the node of the reset signal RST.

Figure 13:
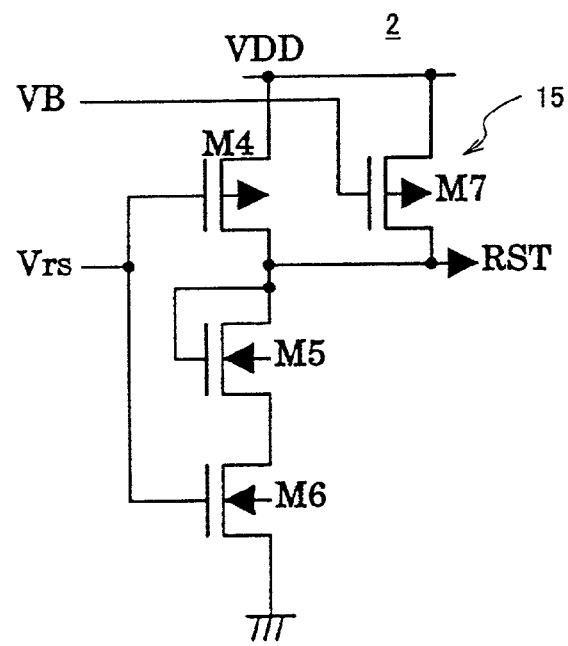
FIG. 13 is a circuit diagram for explaining a seventh structural example of the voltage control circuit of the CMOS sensor circuit according to the present invention.

FIG. 13 is a circuit diagram for explaining a seventh structural example of the voltage control circuit 2 shown in FIG. 4A. In this seventh structural example, the voltage control circuit 2 is characterized in that the constant current source 15 shown in FIG. 12 is realized by applying a bias voltage VB to a gate voltage of a P-channel MOS transistor M7. This constant current source 15 biases the N-channel MOS transistor M5 and the N-channel MOS transistor M6 so as to apply a stable potential to the node of the reset signal RST.

Figure 14:
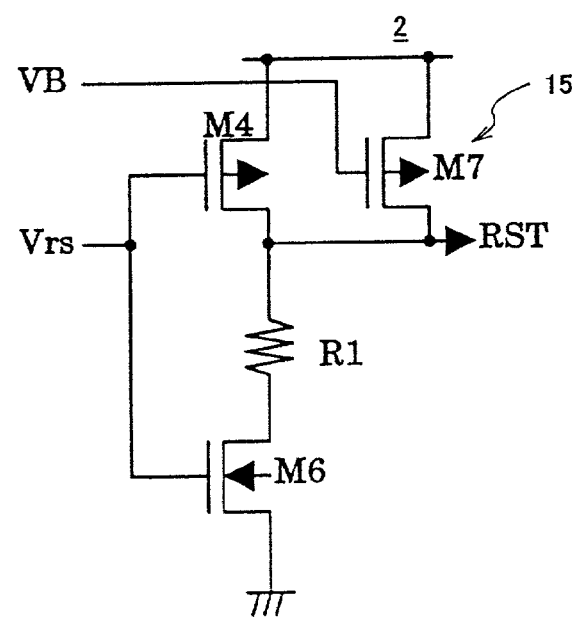
FIG. 14 is a circuit diagram for explaining an eighth structural example of the voltage control circuit of the CMOS sensor circuit according to the present invention.

FIG. 14 is a circuit diagram for explaining an eighth structural example of the voltage control circuit 2 shown in FIG. 4A. In this eighth structural example, the voltage control circuit 2 is characterized in that the N-channel MOS transistor M5 shown in FIG. 13 is formed by a resistance element R1. Also in this example, a voltage drop enables a stable potential to be applied to the node of the reset signal RST.

Figure 15:
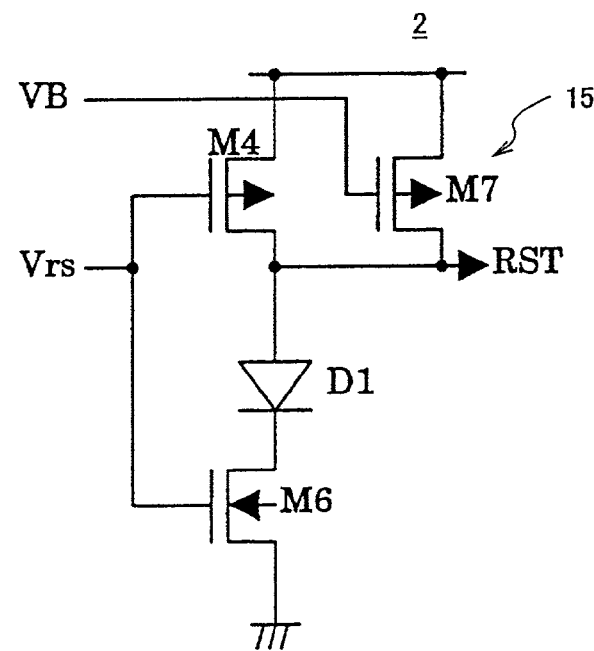
FIG. 15 is a circuit diagram for explaining a ninth structural example of the voltage control circuit of the CMOS sensor circuit according to the present invention.

FIG. 15 is a circuit diagram for explaining a ninth structural example of the voltage control circuit 2 shown in FIG. 4A. In this ninth structural example, the voltage control circuit 2 is characterized in that the N-channel MOS transistor M5 shown in FIG. 13 is formed by a diode element D1. Also in this example, a stable potential can be applied to the node of the reset signal RST.

Figure 16:
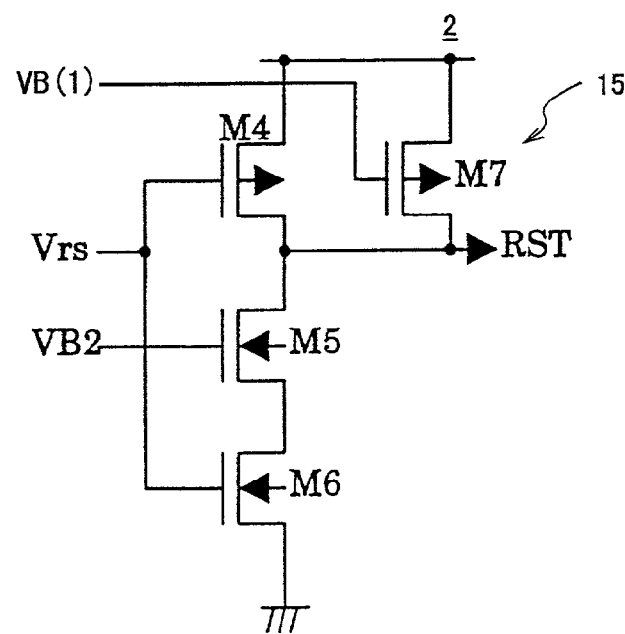
FIG. 16 is a circuit diagram for explaining a tenth structural example of the voltage control circuit of the CMOS sensor circuit according to the present invention.

FIG. 16 is a circuit diagram for explaining a tenth structural example of the voltage control circuit 2 shown in FIG. 4A. In this tenth structural example, the voltage control circuit 2 is characterized in that a bias voltage VB2 is applied to the gate potential of the N-channel MOS transistor M5. The bias voltage VB2 can assume any constant volts. In this example, applying the bias voltage VB2 to the N-channel MOS transistor M5 can fix the gate potential of the N-channel MOS transistor M5 at a different potential so as to impress a stable potential to the node of the reset signal RST. Further, applying the bias voltage VB2 of different constant volts enables an arbitrary change of the potential of the reset signal RST.

Figure 17:
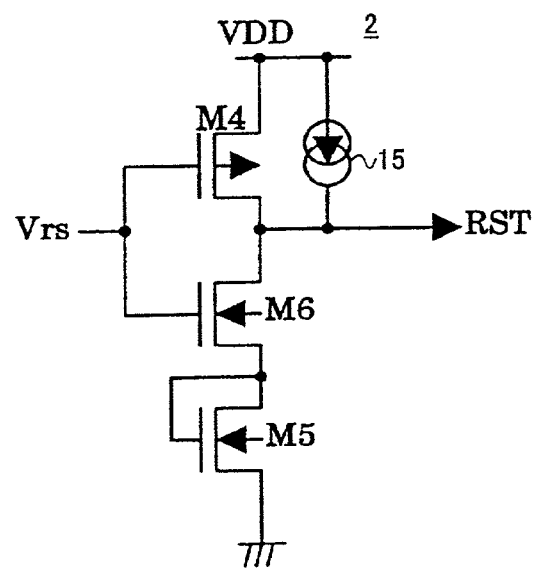
FIG. 17 is a circuit diagram for explaining an eleventh structural example of the voltage control circuit of the CMOS sensor circuit according to the present invention.

FIG. 17 is a circuit diagram for explaining an eleventh structural example of the voltage control circuit 2 shown in FIG. 4A. In this eleventh structural example, the voltage control circuit 2 is characterized in that the N-channel MOS transistor M5 and the N-channel MOS transistor M6 are interchanged in positions. In other words, a source of the N-channel MOS transistor M5 for controlling the above-mentioned blooming is connected to the drain of the N-channel MOS transistor M6. In this example, a resistance or a diode can replace the N-channel MOS transistor M5.

Figure 18:
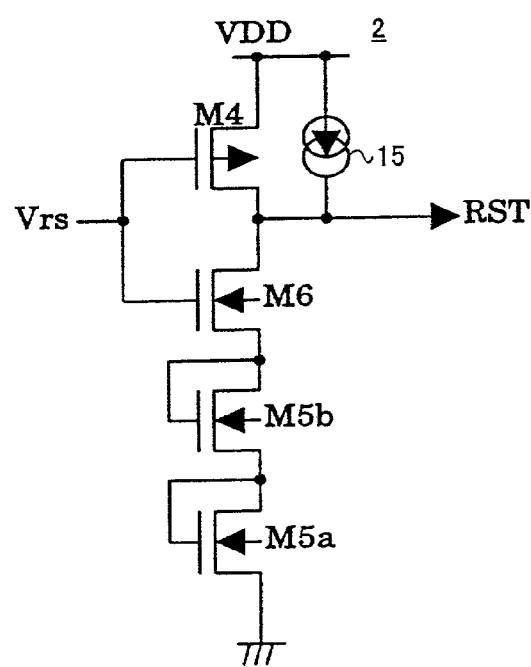
FIG. 18 is a circuit diagram for explaining a twelfth structural example of the voltage control circuit of the CMOS sensor circuit according to the present invention.

FIG. 18 is a circuit diagram for explaining a twelfth structural example of the voltage control circuit 2 shown in FIG. 4A. In this twelfth structural example, the N-channel MOS transistor M5 shown in FIG. 17 is doubled serially. Specifically, as shown in FIG. 18, an N-channel MOS transistor M5a having a gate and a drain connected and a channel MOS transistor M5b having a gate and a drain connected are connected in series. Besides, the number of these transistors M5a and M5b is not limited to two as shown in FIG. 18, but may be larger than two. Further, a P-channel MOS transistor, a resistance element or a diode element can replace the transistors M5a and M5b.

Figure 19:
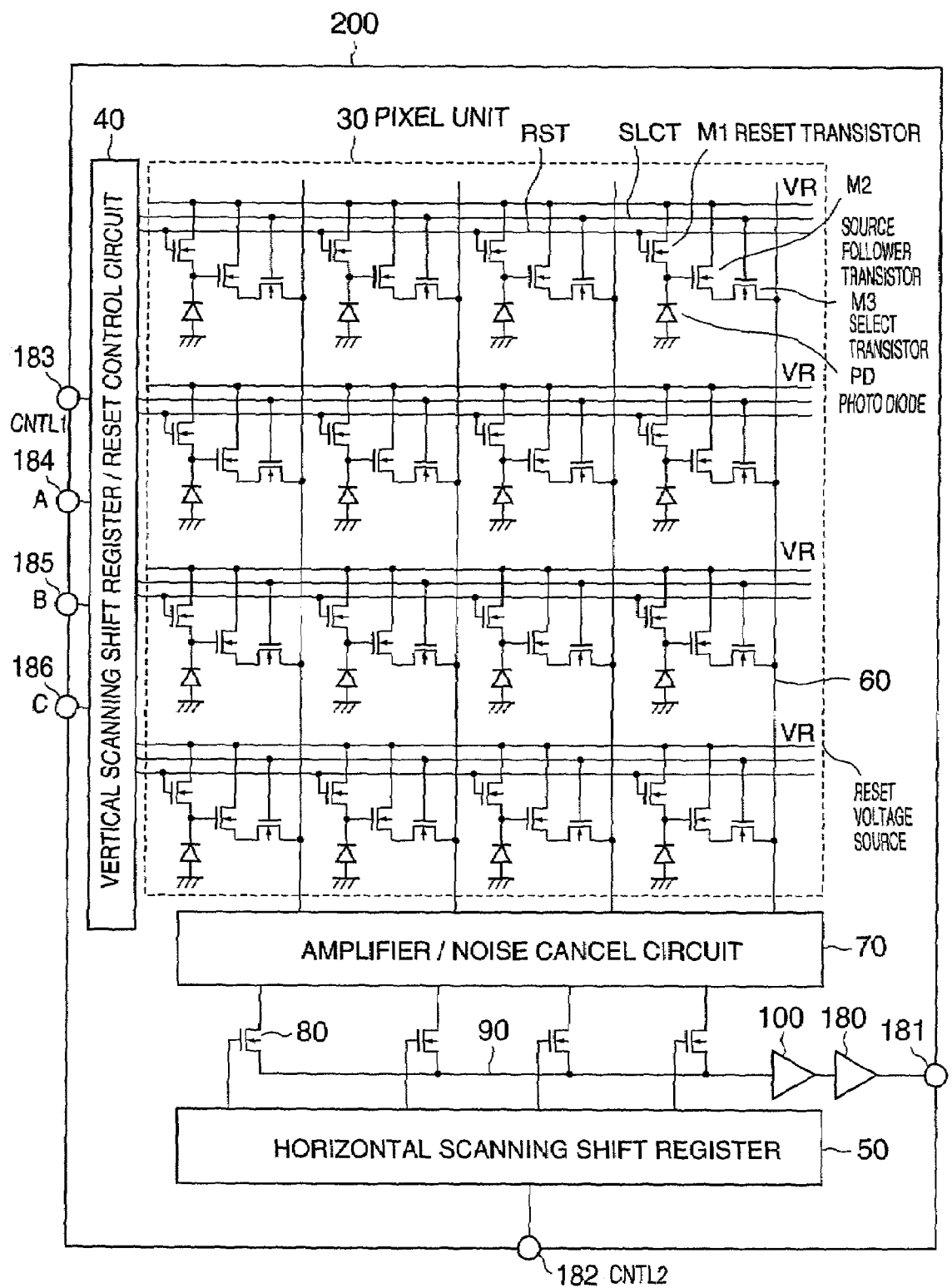
FIG. 19 is a circuit diagram of an IC chip including the CMOS sensor circuit according to the present invention.

FIG. 19 is a circuit diagram of an IC chip including the CMOS sensor circuit according to the present invention. Elements in FIG. 19 that are identical to the elements described above are referenced by the same reference marks.

The IC chip comprises the CMOS sensor circuit according to the present invention, an A/D converter 180, and external connection terminals 181 to 186, provided on a chip 200. An output of the output amplifier 100 is sent out via the A/D converter 180 and the external connection terminal 181. The above-mentioned control signal CNTL2 is supplied via the external connection terminal 182 to the horizontal scanning shift register 50. The above-mentioned control signal CNTL1 is supplied via the external connection terminal 183 to the flip-flop FF1 of the vertical scanning shift register/reset control circuit 40. The above-mentioned control signals A, B and C are supplied via the external connection terminals 184, 185 and 186, respectively, to the logic circuits of the vertical scanning shift register/reset control circuit 40.

The present invention is not limited to the specifically disclosed embodiments, and variations and modifications may be made without departing from the scope of the present invention.

The present application is based on Japanese priority application No. 2001-135503 filed on May 2, 2001, the entire contents of which are hereby incorporated by reference.

What is claimed is:

1. A CMOS sensor circuit comprising:
   a photodiode;
   a reset transistor resetting said photodiode to an initial voltage;
   a voltage control circuit generating a reset signal in response to a reset control signal, the reset signal controlling a gate potential of said reset transistor to a potential other than power source potentials, wherein said voltage control circuit comprises an inverter circuit driving a gate of said reset transistor, the inverter circuit including a first P-channel MOS transistor having a gate supplied with a first reset control signal, an N-channel MOS transistor having a gate supplied with a second reset control signal, and a transistor provided between a drain of said first P-channel MOS transistor and a drain of said N-channel MOS transistor to control a blooming of the CMOS sensor circuit; and
   a delay circuit producing said first reset control signal which is supplied to the gate of the first P-channel MOS transistor, by delaying said second reset control signal supplied to the gate of the N-channel MOS transistor.

2. The CMOS sensor circuit as claimed in claim 1, said delay circuit is formed by an even number of inverters.

3. The CMOS sensor circuit as claimed in claim 1, wherein said voltage control circuit comprises:
   an inverter circuit driving a gate of said reset transistor, the inverter circuit including a first P-channel MOS transistor and an N-channel MOS transistor; and
   a transistor inserted between a drain of said first P-channel MOS transistor and a drain of said N-channel MOS transistor so as to control a blooming.

4. The CMOS sensor circuit as claimed in claim 3, wherein said transistor is one of a P-channel MOS transistor and an N-channel MOS transistor.

5. The CMOS sensor circuit as claimed in claim 3, wherein said transistor is one of a P-channel MOS transistor and an N-channel MOS transistor, and includes a gate and a drain connected to each other.

6. The CMOS sensor circuit as claimed in claim 3, an arbitrary bias voltage is applied to said transistor.

7. The CMOS sensor circuit as claimed in claim 1, wherein said voltage control circuit comprises:
   an inverter circuit driving a gate of said reset transistor, the inverter circuit including a first P-channel MOS transistor and an N-channel MOS transistor; and
   a transistor connected to a drain of said N-channel MOS transistor so as to control a blooming.

8. The CMOS sensor circuit as claimed in claim 3, further comprising a plurality of serially connected transistors inserted between said drain of said first P-channel MOS transistor and said drain of said N-channel MOS transistor so as to control the blooming.

9. The CMOS sensor circuit as claimed in claim 7, further comprising a plurality of serially connected transistors connected to said drain of said N-channel MOS transistor so as to control the blooming.

10. The CMOS sensor circuit as claimed in claim 7, wherein said transistor is one of a P-channel MOS transistor and an N-channel MOS transistor, and includes a gate and a drain connected to each other.

11. The CMOS sensor circuit as claimed in claim 7, an arbitrary bias voltage is applied to said transistor.

12. The CMOS sensor circuit as claimed in claim 1, wherein said voltage control circuit comprises:
   an inverter circuit driving a gate of said reset transistor, the inverter circuit including a first P-channel MOS transistor and an N-channel MOS transistor; and
   one of a resistance element and a diode element inserted between a drain of said first P-channel MOS transistor and a drain of said N-channel MOS transistor so as to control a blooming.

13. The CMOS sensor circuit as claimed in claim 12, wherein said resistance element and said diode element are replaced by a plurality of serially connected resistance elements and a plurality of serially connected diode elements, respectively.

14. The CMOS sensor circuit as claimed in claim 1, wherein said voltage control circuit comprises:
   an inverter circuit driving a gate of said reset transistor, the inverter circuit including a first P-channel MOS transistor and an N-channel MOS transistor; and
   one of a resistance element and a diode element connected to a drain of said N-channel MOS transistor so as to control a blooming.

15. The CMOS sensor circuit as claimed in claim 14, wherein said resistance element and said diode element are replaced by a plurality of serially connected resistance elements and a plurality of serially connected diode elements, respectively.

16. A CMOS sensor circuit comprising:
   a photodiode;
   a reset transistor resetting said photodiode to an initial voltage;
   a voltage control circuit generating a reset signal in response to a reset control signal, the reset signal keeping a gate potential of said reset transistor from completely becoming off, wherein said voltage control circuit comprises an inverter circuit driving a gate of said reset transistor, the inverter circuit including a first P-channel MOS transistor having a gate supplied with a first reset control signal, an N-channel MOS transistor having a gate supplied with a second reset control signal, and a transistor provided between a drain of said first P-channel MOS transistor and a drain of said N-channel MOS transistor to control a blooming of the CMOS sensor circuit; and a delay circuit producing said first reset control signal which is supplied to the pate of the first P-channel MOS transistor, by delaying said second reset control signal supplied to the pate of the N-channel MOS transistor.

17. The CMOS sensor circuit as claimed in claim 16, said delay circuit is formed by an even number of inverters.

18. The CMOS sensor circuit as claimed in claim 16, wherein said voltage control circuit comprises:
an inverter circuit driving a gate of said reset transistor, the inverter circuit including a first P-channel MOS transistor and an N-channel MOS transistor; and
a transistor inserted between a drain of said first P-channel MOS transistor and a drain of said N-channel MOS transistor so as to control a blooming.

19. The CMOS sensor circuit as claimed in claim 18, further comprising a plurality of serially connected transistors inserted between said drain of said first P-channel MOS transistor and said drain of said N-channel MOS transistor so as to control the blooming.

20. The CMOS sensor circuit as claimed in claim 18, wherein said transistor is one of a P-channel MOS transistor and an N-channel MOS transistor.

21. The CMOS sensor circuit as claimed in claim 18, wherein said transistor is one of a P-channel MOS transistor and an N-channel MOS transistor, and includes a gate and a drain connected to each other.

22. The CMOS sensor circuit as claimed in claim 18, an arbitrary bias voltage is applied to said transistor.

23. The CMOS sensor circuit as claimed in claim 16, wherein said voltage control circuit comprises:
an inverter circuit driving a gate of said reset transistor, the inverter circuit including a first P-channel MOS transistor and an N-channel MOS transistor; and
a transistor connected to a drain of said N-channel MOS transistor so as to control a blooming.

24. The CMOS sensor circuit as claimed in claim 23, further comprising a plurality of serially connected transistors connected to said drain of said N-channel MOS transistor so as to control the blooming.

25. The CMOS sensor circuit as claimed in claim 23, wherein said transistor is one of a P-channel MOS transistor and an N-channel MOS transistor, and includes a gate and a drain connected to each other.

26. The CMOS sensor circuit as claimed in claim 23, an arbitrary bias voltage is applied to said transistor.

27. The CMOS sensor circuit as claimed in claim 16, wherein said voltage control circuit comprises:
an inverter circuit driving a gate of said reset transistor, the inverter circuit including a first P-channel MOS transistor and an N-channel MOS transistor; and
one of a resistance element and a diode element inserted between a drain of said first P-channel MOS transistor and a drain of said N-channel MOS transistor so as to control a blooming.

28. The CMOS sensor circuit as claimed in claim 27, wherein said resistance element and said diode element are replaced by a plurality of serially connected resistance elements and a plurality of serially connected diode elements, respectively.

29. The CMOS sensor circuit as claimed in claim 16, wherein said voltage control circuit comprises:
an inverter circuit driving a gate of said reset transistor, the inverter circuit including a first P-channel MOS transistor and an N-channel MOS transistor; and
one of a resistance element and a diode element connected to a drain of said N-channel MOS transistor so as to control a blooming.

30. The CMOS sensor circuit as claimed in claim 29, wherein said resistance element and said diode element are replaced by a plurality of serially connected resistance elements and a plurality of serially connected diode elements, respectively.

31. The CMOS sensor circuit as claimed in claim 16, wherein said voltage control circuit comprises an output node connected to a gate of said reset transistor, and a constant current source added to said output node.

32. The CMOS sensor circuit as claimed in claim 31, wherein said constant current source is formed by a second P-channel MOS transistor having a bias voltage applied to a gate voltage thereof.

* * * * *